United States Patent
Lin et al.

(10) Patent No.: US 11,218,186 B2
(45) Date of Patent: Jan. 4, 2022

(54) 10-METER 100 GBPS COPPER WIRE ETHERNET CABLE

(71) Applicant: Credo Technology Group Limited, Grand Cayman (KY)

(72) Inventors: Jiamin Lin, Fuzhou (CN); Baohua Chen, Xiamen (CN)

(73) Assignee: Credo Technology Group Limited, Grand Cayman (KY)

(*) Notice: Subject to any disclaimer, the term of this patent is extended or adjusted under 35 U.S.C. 154(b) by 0 days.

(21) Appl. No.: 17/149,468

(22) Filed: Jan. 14, 2021

(65) Prior Publication Data
US 2021/0273678 A1  Sep. 2, 2021

(30) Foreign Application Priority Data
Mar. 1, 2020 (CN) .......................... 202010134827.7

(51) Int. Cl.
H04B 3/02 (2006.01)
H04L 7/00 (2006.01)

(52) U.S. Cl.
CPC ............. *H04B 3/02* (2013.01); *H04L 7/0016* (2013.01)

(58) Field of Classification Search
CPC ....................................................... H04B 3/02
See application file for complete search history.

(56) References Cited

U.S. PATENT DOCUMENTS

| 4,646,320 | A | 2/1987 | Krishnan |
| 5,736,967 | A | 4/1998 | Kayser et al. |
| 7,049,937 | B1* | 5/2006 | Zweig .................. H01R 13/641 324/66 |
| 7,401,985 | B2 | 7/2008 | Aronson et al. |

(Continued)

FOREIGN PATENT DOCUMENTS

| CN | 1298575 A | 6/2001 |
| CN | 2562447 Y | 7/2003 |

(Continued)

OTHER PUBLICATIONS

40 Gigabit Ethernet, 40G QSFP+, 40GBASE-LR4, 40G-BASE-SR4, CFP module, CXP Transceiver, MPO MTP Fiber on May 25, 2015 [http://www.cables-solutions.com/guide-to-40-gigabit-ethernet-options.html].

(Continued)

*Primary Examiner* — Qutbuddin Ghulamali
(74) *Attorney, Agent, or Firm* — Ramey & Schwaller LLP

(57) ABSTRACT

Novel cable designs and methods for mass-manufacturing long, 100 Gbps cables suitable for large communication centers. One illustrative cable embodiment includes: at least eight pairs of electrical conductors connected between a first connector and a second connector, each of said electrical conductors being 30 AWG or smaller in cross-section and about 10 meters or longer in length, each of the first and second connectors being adapted to fit into an Ethernet port of a corresponding host device, each of the first and second (Continued)

connectors including a respective transceiver that performs clock and data recovery on the electrical input signal to extract and re-modulate the outbound data stream for transit via at least four of the pairs of electrical conductors as differential NRZ (non-return to zero) electrical transit signals each having a signaling rate of at least 25 GBd to convey a total of at least 100 GBd in each direction.

19 Claims, 5 Drawing Sheets

(56) References Cited

U.S. PATENT DOCUMENTS

| | | | |
|---|---|---|---|
| 9,203,730 | B1 | 12/2015 | Johnson |
| 9,230,416 | B2* | 1/2016 | Ward .................. G08B 5/36 |
| 9,322,704 | B1 | 4/2016 | Neveux |
| 9,337,993 | B1* | 5/2016 | Lugthart .............. H04L 7/0054 |
| 9,438,338 | B1 | 9/2016 | Chan et al. |
| 10,078,568 | B1 | 9/2018 | Stoler |
| 10,212,260 | B2 | 2/2019 | Sun |
| 10,659,854 | B1 | 5/2020 | Alfiad |
| 10,877,233 | B1 | 12/2020 | Dai et al. |
| 10,944,584 | B1 | 3/2021 | Cheng |
| 11,012,252 | B2 | 5/2021 | Lam et al. |
| 11,018,709 | B2 | 5/2021 | Lam |
| 2002/0000831 | A1 | 1/2002 | Smith |
| 2004/0103441 | A1 | 5/2004 | Williams |
| 2007/0002328 | A1 | 1/2007 | Woods et al. |
| 2007/0116023 | A1 | 5/2007 | Tatapudi |
| 2007/0237464 | A1 | 10/2007 | Aronson |
| 2008/0043781 | A1 | 2/2008 | Taskiran et al. |
| 2011/0142022 | A1 | 6/2011 | Kubo |
| 2013/0243431 | A1 | 9/2013 | Pointurier |
| 2013/0343400 | A1 | 12/2013 | Lusted |
| 2013/0346667 | A1 | 12/2013 | Stroud |
| 2014/0086264 | A1 | 3/2014 | Lusted |
| 2014/0146833 | A1 | 5/2014 | Lusted et al. |
| 2014/0182124 | A1 | 7/2014 | Louderback |
| 2015/0334186 | A1 | 11/2015 | Chen |
| 2016/0197434 | A1* | 7/2016 | Lett .................. H04N 5/2257 348/373 |
| 2017/0170905 | A1 | 6/2017 | Tanaka |
| 2017/0170927 | A1 | 6/2017 | Stone |
| 2018/0241579 | A1* | 8/2018 | Lin .................. H04L 12/10 |
| 2018/0335576 | A1 | 11/2018 | Farbert et al. |
| 2020/0280329 | A1 | 9/2020 | Lam et al. |
| 2020/0280458 | A1 | 9/2020 | Lam et al. |

FOREIGN PATENT DOCUMENTS

| | | |
|---|---|---|
| CN | 1941649 B | 4/2007 |
| CN | 202797544 U | 3/2013 |
| CN | 103996448 A | 8/2014 |
| CN | 104038454 A | 9/2014 |
| CN | 104838636 A | 12/2015 |
| CN | 109075992 A | 12/2018 |
| CN | 109286416 A | 1/2019 |
| CN | 111641090 A | 9/2020 |
| JP | 2013157160 A | 8/2013 |
| WO | 2018161273 A | 9/2018 |

OTHER PUBLICATIONS

Management Data Input/Output. (Nov. 25, 2018). Wikiepedia. Retrieved Jan. 23, 2019, from https://en.wikipedia.org/wiki/Management_Data_Input/Output.

IEEE P802.3cd/D1 .2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation.

Optical Internetworking Forum Contribution OIF2014.277.11 "CEI-56G-VSR-NRZ Very Short Reach Interface" Mar. 1, 2019.

QSFP-DD MSA—QSFP-DD Hardware Specification for QSFP Double Density 8X Pluggable Transceiver Rev 4.0 Candidate. Aug. 15, 2018.

Rumer, B. (Feb. 1, 2001). Fighting Jitter in Fibre-Channel Designs. EE Times. Retrieved Jan. 23, 2019, from https://www.eetimes.com/document.asp?doc_id=1277249#.

Chinese Office Action dated Apr. 15, 2021 for corresponding CN 201910155916.7.

Chinese Office Action dated May 28, 2021 for corresponding CN 201910155535.9.

Chinese Office Action dated Jul. 5, 2021 for corresponding CN 201910542442.1.

International Search Report and Written Opinion dated Dec. 6, 2017 for Application No. PCT/CN2017/075961 filed Mar. 8, 2017.

ExParte Quayle Action for U.S. Appl. No. 16/539,910.

Notice of Allowance dated Jun. 24, 2020 for U.S. Appl. No. 16/539,910.

Notification of Reopening of Prosecution Due to Consideration of Information Disclosure Statement Filed After Mailing of a Notice of Allowance for U.S. Appl. No. 16/539,910.

Non Final Office Action for U.S. Appl. No. 16/541,094.

Restriction Requirement for U.S. Appl. No. 16/541,094.

Notice of Allowance dated Oct. 15, 2020 for U.S. Appl. No. 16/698,935.

Supplemental Notice of Allowance dated Nov. 6, 2020 for U.S. Appl. No. 16/698,935.

DSFP-MSA Specification for Dual Small Form Factor Pluggable Module, Rev. 1.0; Sep. 12, 2018, 31 pages.

SFP-DD Management Interface Specification, Rev. 1.0; Sep. 18, 2019, 153 pages.

SFP-DD MSA, SFP-DD Hardware Specification for SFP Double Density 2X Pluggable Transceiver, Rev. 3.0; Apr. 10, 2019, 60 pages.

* cited by examiner

10-METER 100 GBPS COPPER WIRE ETHERNET CABLE

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mb/s to 100 Gb/s over coaxial cable, twinaxial cable, twisted wire pair cable, fiber optic cable, and electrical backplanes, with various channel signal constellations. Among the various signal specifications provided by the standard are CAUI-4 (100 Gbps Attachment Unit Interface using 4 lanes), 100GBASE-CR4, and 100GBASE-KR4, each of which couples to a Physical Coding Sublayer (PCS) and hence presumes the use of a data stream employing the channel coding, scrambling, block multiplexing, and alignment features provided in Clause 82 of the standard.

CAUI-4, which is set out in Annex 83D and Annex 83E of the standard, is used for chip-to-chip or chip-to-module connections and employs four lanes of differential, two-level signaling at a rate of 25.78125 GBd with either no forward error correction (FEC) protection or with RS(528,514) Reed-Solomon FEC coding as set out in Clause 91 of the standard. Ports and connectors that comply with the QSFP-28 specification may employ CAUI-4 for a 100 Gbps inbound data stream and for a 100 Gbps outbound data stream.

100GBASE-CR4, which is set out in Clause 92 of the standard, is a specification of a baseband medium intended for use in a multiconductor cable. It employs four lanes of differential, two-level pulse amplitude modulation signaling at a rate of 25.78125 GBd with RS(528,514) Reed-Solomon FEC coding as set out in Clause 91 of the standard.

100GBASE-KR4, which is set out in Clause 93 of the standard, is a specification of a baseband medium intended for use on an electrical backplane. It employs four lanes of differential, two-level pulse amplitude modulation signaling at a rate of 26.5625 GBd with RS(544,514) Reed-Solomon FEC coding as set out in Clause 91 of the standard. Both the RS(528,514) and RS(544,514) codes operate on 10 bit symbols, with the former being capable of correcting up to 7 symbols in any given data frame and the later being capable of correcting up to 15 symbols in any given data frame.

An update to the standard, IEEE 802.3cd, was approved in December 2018, and it allows for 100GBASE-CR4 to employ RS(544,514) Reed-Solomon FEC coding at the higher signaling rate of 26.5625 GBd using differential, two-level pulse amplitude modulation across four lanes in each direction. The update, IEEE 802.3cd, further sets forth (in Clause 135) 100GBASE-CR2, which unlike CR4, uses differential PAM4 signaling rather than 2-level signaling. As part of the process for adapting a 2-level signal to a 4-level signal, the update provides for the use of Gray coding and 1/(1+D) mod 4 precoding. The differential PAM4 signaling is performed over two lanes in each direction at a rate of 26.5625 GBd with RS(544,514) Reed-Solomon FEC coding.

The update similarly sets for 100GBASE-KR2, providing for differential PAM4 signaling on an electrical backplane using two lanes in each direction at a rate of 26.5625 GBd with RS(544,514) Reed-Solomon FEC coding. As with CR4, Gray coding and 1/(1+D) mod 4 precoding is used for adapting two-level signaling to PAM4.

For high bandwidth communications (≥100 Gbps) over distances greater than about 3 meters, the standard contemplates the use of fiberoptic cables. However, such cables tend to be undesirably expensive as compared with copper wire cables. Unfortunately, for high bandwidth communications over distances beyond 7 meters in conventional data centers, even cables using 100GBASE-CR2 tend to be undesirably bulky, inflexible, and heavy.

SUMMARY

Accordingly, there are disclosed herein novel cable designs and manufacturing methods for mass-manufacturing of long, 100 Gbps cables suitable for large communication centers. One illustrative cable embodiment includes: at least eight pairs of electrical conductors connected between a first connector and a second connector, each of said electrical conductors being 30 AWG or smaller in cross-section and about 10 meters or longer in length, each of the first and second connectors being adapted to fit into an Ethernet port of a corresponding host device to receive an electrical input signal to the cable conveying an outbound data stream from that host device and to provide an electrical output signal from the cable conveying an inbound data stream to that host device, each of the first and second connectors including a respective transceiver that performs clock and data recovery on the electrical input signal to extract and re-modulate the outbound data stream for transit via at least four of the pairs of electrical conductors as differential NRZ (non-return to zero) electrical transit signals each having a signaling rate of at least 25 GBd to convey a total of at least 100 GBd in each direction.

One illustrative cable manufacturing method that includes: connecting at least eight pairs of electrical conductors between a first transceiver and a second transceiver, respectively, to transport at least eight differential NRZ electrical transit signals each having a signaling rate of at least 25 GBd to convey a total of at least 100 GBd in each direction, each of the electrical conductors being 30 AWG or smaller in cross-section and about 10 meters or longer in length; packaging the first transceiver into a first connector configured to couple a first electrical input signal from a network interface port of a first host device to the first transceiver and a first electrical output signal from the first transceiver to the network interface port of the first host device; and packaging the second transceiver into a second connector configured to couple a second electrical input signal from a network interface port of a second host device to the second transceiver and a second electrical output signal from the second transceiver to the network interface port of the second host device, the first and second transceivers being configured to perform clock and data recovery on the first and second electrical input signal to extract and re-modulate the first and second outbound data streams as said differential NRZ electrical transit signals.

Each of the foregoing embodiments may be implemented individually or in combination, and may be implemented with one or more of the following features in any suitable combination: 1. the electrical input and electrical output signals for at least one of said transceivers each comprise two lanes of differential PAM4 signals. 2. the at least one of said transceivers uses bit multiplexing or demultiplexing to convert between each lane of differential PAM4 signals and two corresponding lanes of differential NRZ electrical transit signals. 3. the connector for the at least one of said transceivers is adapted to fit a SFP56-DD compliant Ethernet port. 4. the connector for the at least one of said transceivers is adapted to fit a DSFP compliant Ethernet port. 5. each of said transceivers uses bit multiplexing or demultiplexing to convert between each lane of differential PAM4 signals and two corresponding lanes of differential NRZ electrical transit signals. 6. the electrical transit signals are protected with a RS(544,514) Reed-Solomon forward error correction code. 7. the electrical input and electrical output signals for at least one of said transceivers each comprises four lanes of differential NRZ signals protected with a RS(528,514) Reed-Solomon forward error correction code. 8. the at least one of said transceivers uses error correction decoding and encoding to convert between the electrical transit signals and the electrical input and output signals. 9. the connector for the at least one of said transceivers is adapted to fit a QSFP-28 compliant Ethernet port.

DETAILED DESCRIPTION

Figure 1:
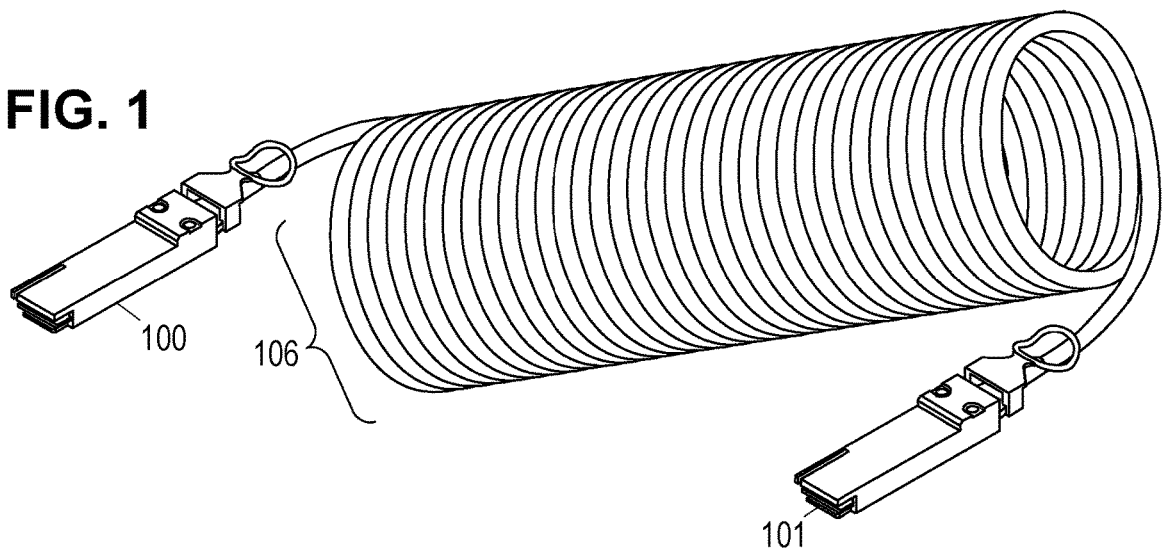
FIG. 1 is a perspective view of an illustrative active Ethernet cable (AEC).

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative 100 Gbps cable that may be used to provide a high-bandwidth communications link between devices in a routing network such as that used for data centers, server farms, and interconnection exchanges. The routing network may be part of, or may include, for example, the Internet, a wide area network, or a local area network. The linked devices may be computers, switches, routers, and the like. The cable includes a first connector 100 and a second connector 101 that are connected via electrical conductors 106 in a cord that is 9 m, 10 m or longer. The electrical conductors 106 may be arranged in a paired form such as with twinaxial conductors. Twinaxial conductors can be likened to coaxial conductors, but with two inner conductors instead of one. The inner conductors may be driven with a differential signal and their shared shield operates to reduce crosstalk with other twinaxial conductors in the cable. Depending on the performance criteria, it may be possible to employ other paired or single-ended conductor implementations.

Pursuant to the Ethernet standard, each conductor pair may provide unidirectional transport of a differential signal. To enable robust performance over even extended cable lengths (greater than, say, 3 m, 6 m, or 9 m), each connector 102, 104 may include a powered transceiver that performs clock and data recovery (CDR) and re-modulation of data streams in each direction. The powered transceivers are also known as data recovery and re-modulation (DRR) devices. Notably, the transceivers perform CDR and re-modulation not only of the outbound data streams as they exit the cable, but also of the inbound data streams as they enter the cable.

In at least one contemplated embodiment, the cable connectors 100, 101 are quad small form-factor pluggable (QSFP) transceiver modules, and more specifically, QSFP28 transceiver modules, which exchange CAUI-4 data streams with the host. In other contemplated embodiments, the cable connectors are dual small form-factor pluggable (DSFP) or small form-factor pluggable, double-density (SFP-DD) transceiver modules, which exchange 100GBASE-KR2 data streams with the host. (More properly, this SFP-DD transceiver is called SFP56-DD.) In still other contemplated embodiments, the cable connectors are different, such as with a QSFP28 to SFP56-DD cable, a QSFP28 to DSFP cable, or a SFP56-DD to DSFP cable.

Figure 2:
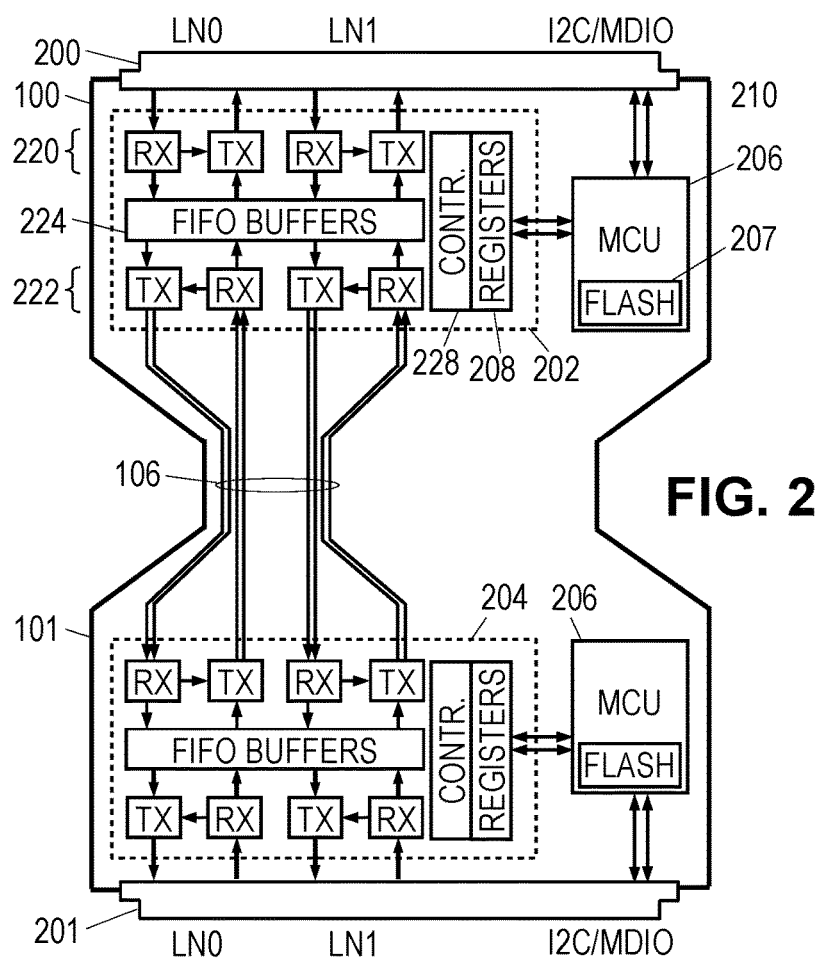
FIG. 2 is a function-block diagram of an illustrative AEC.

FIG. 2 is a function-block diagram of an illustrative cable of FIG. 1. Connector 100 includes a plug 200 adapted to fit a standard-compliant Ethernet port in a first host device 302 (see FIG. 3) to receive an electrical input signal carrying an outbound data stream from the host device and to provide an electrical output signal carrying an inbound data stream to the host device. Similarly, connector 101 includes a plug 201 that fits an Ethernet port of a second host device 304. Connector 100 includes a first DRR device 202 to perform CDR and re-modulation of the data streams entering and exiting the cable at connector 100, and connector 101 includes a second DRR device 204 to perform CDR and re-modulation of the data streams entering and exiting the cable at connector 101. The DRR devices 202, 204 may be integrated circuits mounted on a printed circuit board and connected to edge connector contacts via circuit board traces. The electrical conductors 106 and shields may be soldered to corresponding pads on the printed circuit board that electrically connect to the DRR devices.

In at least some contemplated embodiments, the printed circuit boards each also support a micro-controller unit (MCU) 206. Each DRR device 202, 204 is coupled to a respective MCU device 206 which configures the operation of the DRR device via a first two-wire bus. At power-on, the MCU device 206 loads equalization parameters and/or other operating parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance.

Each DRR device 202, 204, includes a set 220 of transmitters and receivers for communicating with the host device and a set 222 of transmitters and receivers for sending and receiving via conductor pairs running the length of the cable. The cable-facing transceivers 222 preferably send and receive using 100GBASE-CR4, using differential NRZ at 26.5625 GBd over four lanes in each direction rather than 100GBASE-CR2, which uses differential PAM4 at 26.5625 GBd over two lanes in each direction. To provide a range of 10 m or more, CR2 signaling would necessitate the use of copper wire having a cross-section of at least AWG26, whereas the authors have found that with the improved signal margin of NRZ signaling, a cross-section of no more than AWG30 would suffice for CR4 signaling. Even when accounting for doubling the number of conductors, a reduction in total cross-section is achieved, along with commensurate reductions in rigidity and material cost.

The illustrated host-facing transceivers 220 support two lanes LN0-LN1 for bidirectional communication with the host device, each bidirectional lane formed by two unidirectional connections with differential PAM4 signaling at 26.5625 GBd, such as may be achieved with 100GBASE-KR2. In other contemplated embodiments, the host-facing transceivers 220 support four lanes using differential NRZ signaling in accordance with the CAUI-4 specification. The DRR devices include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 208 to receive commands and parameter values, and to provide responses potentially including status information and performance data.

In at least some contemplated embodiments, the host-facing transmitter and receiver set 220 employ fixed equalization parameters that are cable-independent, i.e., they are not customized on a cable-by-cable basis. The center-facing transmitter and receiver set 222 preferably employ cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

Figure 3:
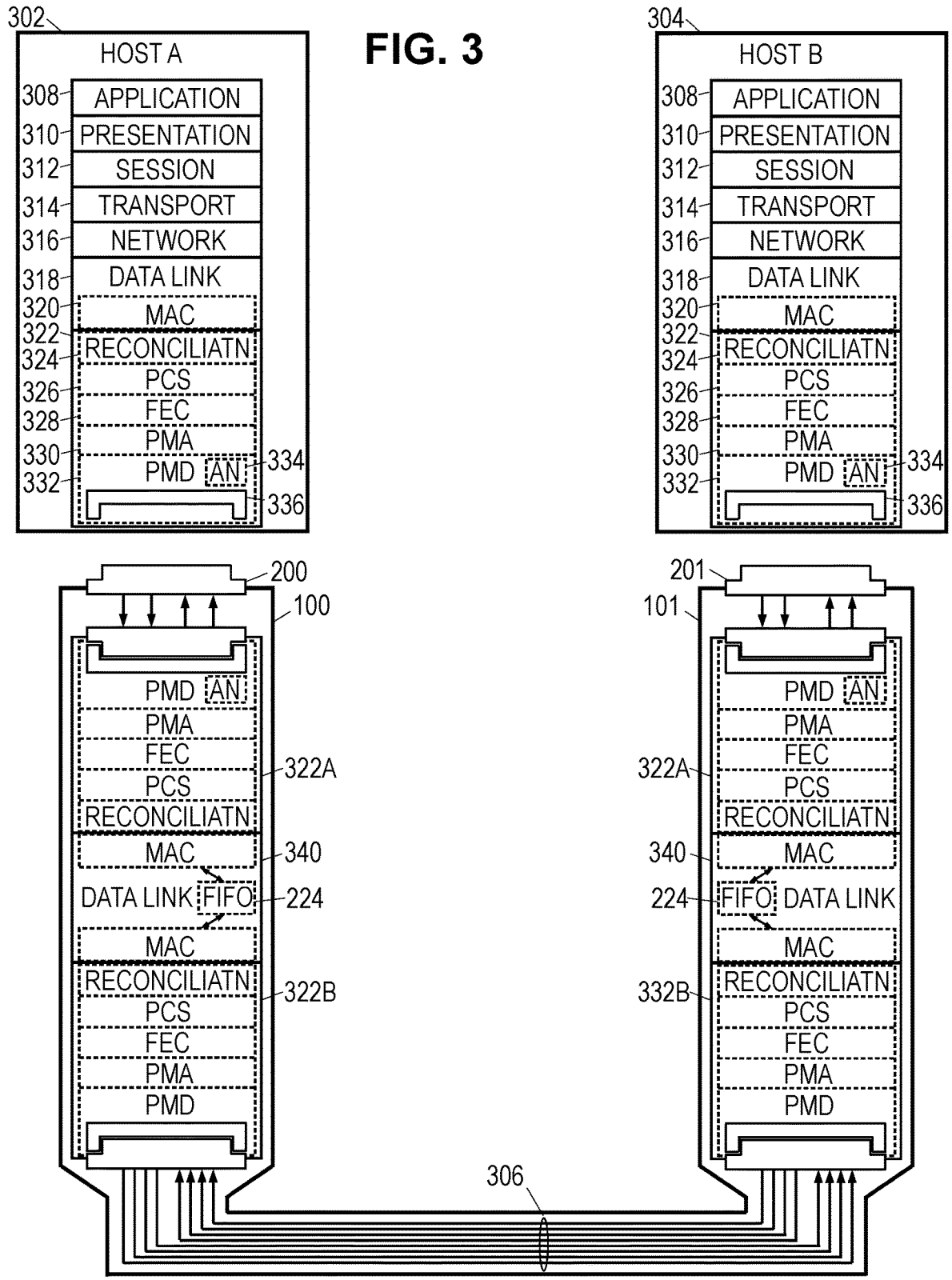
FIG. 3 is an architectural diagram for a communications link including the illustrative cable.

The illustrative cable of FIG. 2 may be a part of a point-to-point communications link between two host devices 302, 304 as shown in the architectural diagram of FIG. 3. FIG. 3 shows the architecture using the ISO/IEC Model for Open Systems Interconnection (See ISO/IEC 7498-1:1994.1) for communications over a physical medium such as the electrical conductors 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented using micro-code and/or application-specific hardware.

The Application Layer 308 is the uppermost layer in the model, and it represents the user applications or other software operating on different systems that need a facility for communicating messages or data. The Presentation Layer 310 provides such applications with a set of application programming interfaces (APIs) that provide formal syntax along with services for data transformations (e.g., compression), establishing communication sessions, connectionless communication mode, and negotiation to enable the application software to identify the available service options and select therefrom. The Session Layer 312 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 314 provides services for multiplexing, end-to-end sequence control, error detection, segmenting, blocking, concatenation, flow control on individual connections (including suspend/resume), and implementing end-to-end service quality specifications. The focus of the Transport Layer 314 is end-to-end performance/behavior. The Network Layer 316 provides a routing service, determining the links used to make the end-to-end connection and when necessary acting as a relay service to couple together such links. The Data link layer 318 serves as the interface to physical connections, providing delimiting, synchronization, sequence and flow control across the physical connection. It may also detect and optionally correct errors that occur across the physical connection. The Physical layer 322 provides the mechanical, electrical, functional, and procedural means to activate, maintain, and deactivate channels 306, and to use the channels 306 for transmission of bits across the physical media.

The Data Link Layer 318 and Physical Layer 322 are subdivided and modified slightly by IEEE Std 802.3-2015, which provides a Media Access Control (MAC) Sublayer 320 in the Data Link Layer 318 to define the interface with the Physical Layer 322, including a frame structure and transfer syntax. Within the Physical Layer 322, the standard provides a variety of possible subdivisions such as the one illustrated in FIG. 3, which includes an optional Reconciliation Sublayer 324, a Physical Coding Sublayer (PCS) 326, a Forward Error Correction (FEC) Sublayer 328, a Physical Media Attachment (PMA) Sublayer 330, a Physical Medium Dependent (PMD) Sublayer 332, and an Auto-Negotiation (AN) Sublayer 334.

The optional Reconciliation Sublayer 324 merely maps between interfaces defined for the MAC Sublayer 320 and the PCS Sublayer 326. The PCS Sublayer 326 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 322, the PCS alignment markers typically include Bit-Interleaved-Parity (BIP) values derived from the preceding bits in the lane up to and including the preceding PCS alignment marker.

The FEC Sublayer 328 provides, e.g., Reed-Solomon coding/decoding that distributes data blocks with controlled redundancy across the lanes to enable error correction. In some embodiments (e.g., in accordance with Clause 91 or Clause 134 of the standard), the FEC Sublayer 328 modifies the number of lanes (Clause 91 provides for a 20-to-4 lane conversion).

The PMA Sublayer 330 provides lane remapping, symbol encoding/decoding, framing, and octet/symbol synchronization. The PMD Sublayer 332 specifies the transceiver conversions between transmitted/received channel signals and the corresponding bit (or digital symbol) streams. An optional AN Sublayer 334 is shown as a internal element of the PMD Sublayer 332, and it implements an initial start-up of the communications channels, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A receptacle 336 is also shown as part of the PMD sublayer 332 to represent the physical network interface port.

The connectors 100, 101, have plugs 200, 201 representing edge connectors that mate with the receptacles 336 of the two host devices 302, 304. Within each connector, the DRR devices may implement a host-facing Physical Layer 322A, a center-facing Physical Layer 322B, and a Data Link Layer 340 that bridges together the two Physical Layers. In some embodiments, one or more of the internal sublayers within each connector (e.g., FEC, PCS, Reconciliation, MAC) are bypassed or omitted entirely to reduce areal requirements and/or to reduce power. More information regarding the operation of the sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can in many cases be found in the current Ethernet standard, and any such details should be considered to be well within the knowledge of those having ordinary skill in the art.

Figure 4:
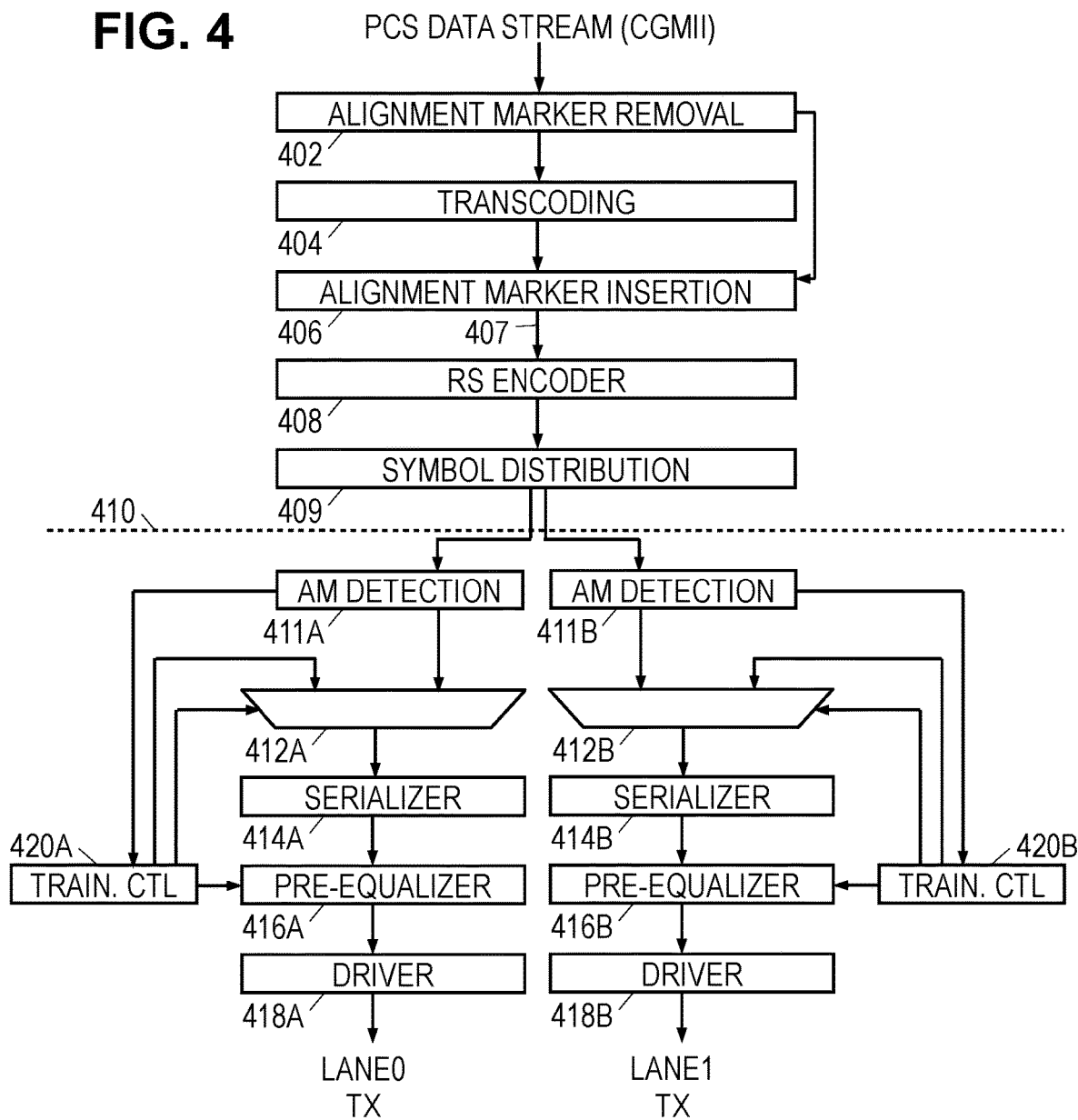
FIG. 4 is a block diagram of a transmit chain in an illustrative multi-lane transceiver.
Figure 5:
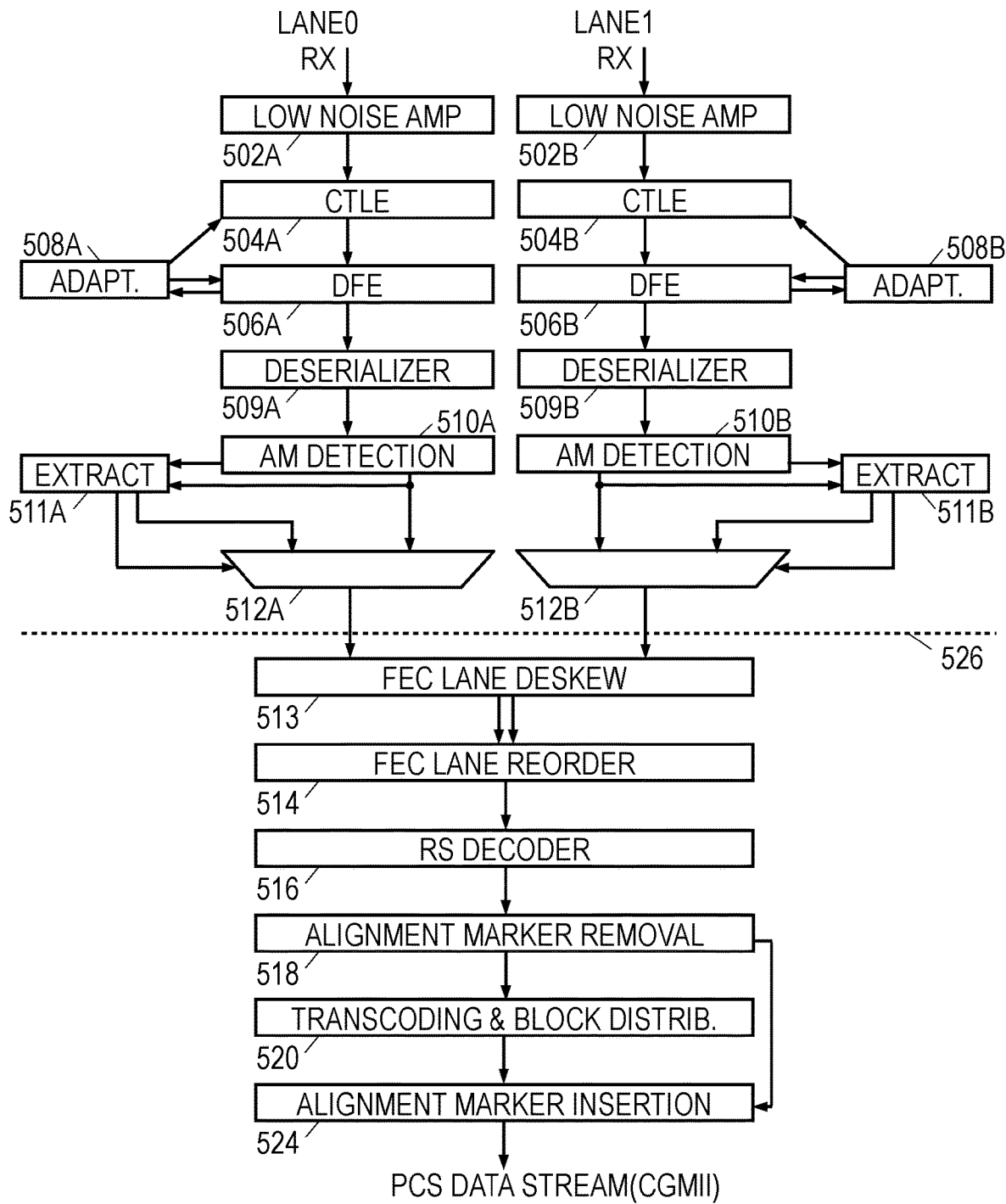
FIG. 5 is a block diagram of a receive chain in an illustrative multi-lane transceiver.

FIGS. 4 and 5 provide a more detailed block diagram of illustrative transmit and receive chains in the sublayers below the PCS. The transmit chain in FIG. 4 accepts a four-lane data stream from the PCS. Pursuant to the standard, the PCS data stream is already encoded with a transmission code that provides DC balance and enables timing recovery. The PCS data stream lanes further include PCS alignment markers for synchronizing the lanes with each other. Once the data stream lanes are aligned, an alignment marker removal module 402 removes the alignment markers from each lane, passing them to a downstream alignment marker insertion module 406. A transcoding module 404 modifies the transmission code from a 64b/66b code to a 256b/257b code more appropriate for use with the Reed-Solomon encoder. By repeatedly transcoding four 66-bit blocks taken in parallel from the four incoming lanes into individual 257-bit blocks, the transcoding module may essentially convert a four lane data stream into a single lane data stream.

The previously-mentioned alignment marker insertion module 406 accepts the PCS alignment marker information from removal module 402 and the single-lane data stream from transcoding module 404. The insertion module 406 combines the alignment marker information from the four lanes into a set of grouped alignment markers in a 257-bit block and, accounting for the operation of the transcoding module 404, inserts the alignment block in a fashion that preserves its location relative to the other data in the data stream 407. The alignment marker insertion block is designed to account for the operation of the encoder module 408 and symbol distribution modules 409 such that the alignment markers appear essentially intact and in order in the two-lane transmit data stream crossing boundary 410.

A Reed-Solomon (RS) encoder module 408 operates on 10-bit "symbol" blocks of the data stream 407 from the insertion module 406, adding redundancy to enable downstream correction of symbol errors. Typically, the encoder module 408 operates to preserve the original data stream content while appending so-called "parity" information, e.g., 30 parity symbol blocks appended to 514 data symbol blocks to form a complete code word block. Thus the alignment blocks inserted by module 406 will remain present in the output data-stream from the encoder module. A symbol distribution module 409 distributes code word symbols across multiple transmission lanes in round-robin fashion, directing each lane to a corresponding transmitter. Boundary 410 may be considered as the boundary between the FEC sublayer 228 and the PMA sublayer 230. Where it is desired to maintain this boundary as strongly as possible, the PMA sublayer may include an alignment marker detection module 411A (and 411B) for each lane of the transmit data stream to detect the alignment markers inserted by module 406 with suitable data buffering. Alternatively, this boundary can be relaxed and the alignment marker detection modules 411A, 411B omitted in favor of appropriate direct signaling from the alignment marker insertion module 406. In either case, the training control modules 420A, 420B control the multiplexers 412A, 412B in each lane, based at least in part on detection signals indicating the presence of the alignment markers.

Multiplexers 412A, 412B forward the encoded data streams to serializer modules 414A, 414B during normal operations and in the absence of alignment markers. During auto-negotiation and training phases, the multiplexers supply negotiation and training data streams from the training control modules 420A, 420B to the serializers. During normal operations in the presence of alignment markers, the multiplexers 412A, 412B (acting as alignment marker replacement modules) may supply the serializer modules with modified alignment markers to convey hidden back-channel information, e.g., as described in U.S. Pat. No. 10,212,260 "SerDes architecture with a hidden backchannel protocol". The serializers 414A, 414B, each accept a stream of transmit data blocks and convert the stream of blocks into a (higher-rate) stream of channel symbols. Where, for example, a 4-PAM signal constellation is used, each serializer may produce a stream of two-bit symbols.

Each stream of channel symbols is filtered by a pre-equalizer module 416A, 416B to produce a transmit signal, which is amplified and supplied to the transmit channel by a driver 418A, 418B. The pre-equalizer modules compensate for at least some of the channel dispersion, reducing or eliminating the need for receiver-side equalization. Such pre-equalization may be advantageous in that it avoids the noise enhancement often associated with receiver-side equalization and enables digital filtering with a reduced bit-width.

One or more training controllers 420A, B, operate to characterize the channel after conducting an initial auto-negotiation phase. During the auto-negotiation phase, at least one training controller generates a sequence of auto-negotiation frames conveying capabilities of the local node to the remote node and negotiating to select a combination of features to be used for subsequent communications. When the auto-negotiation phase is complete, each training controller generates a sequence of training frames, so that training is carried out independently on each of the lanes.

During the training process, the one or more training controllers 420A, B, receive backchannel information extracted by the receiver from the received data stream and use the backchannel information to adjust the coefficients of the pre-equalization filters. The controllers further receive "remote info", which includes locally-generated information for adapting the coefficients of the pre-equalization filter in the remote node. Based on this information the controllers populate the relevant fields of the training frames to provide backchannel information to the remote node. As training frames are employed only during the training phase, and as it may be desirable to continue updating the pre-equalization filter during normal operations, the training controller(s) 420 may include similar backchannel information in or with the modified alignment markers supplied via multiplexers 412A, 412B during normal operations.

We now turn to FIG. 5, which shows a receive chain obtaining analog electrical signals from different receive channels (indicated by Lane0-rx and Lane1-rx). These may be obtained directly from electrical conductors, if the physical medium is an electrical bus or cable, or indirectly via transducers if the physical medium is wireless. Low noise amplifiers (LNA) 502A,B, each provide a high input impedance to minimize channel loading and amplifies the receive signal to drive the input of a continuous time linear equalizer (CTLE) filter 504A,B.

CTLE filters 504A,B provide continuous time filtering to shape the receive signal spectrum in an adaptive fashion to reduce the length of the channel impulse response while minimizing leading inter-symbol interference (ISI). Decision feedback equalizers (DFE) 506A,B operate on the filtered signals to correct for trailing ISI and detect each transmitted channel bit or symbol, thereby producing a demodulated digital data stream. Some embodiments employ oversampling. Clock recovery and adaptation modules 508A,B derive a sampling clock signal from the input and/or output of the DFE's decision element and supply it back to the DFE to control timing of the symbol detection. The adaptation modules 508A,B further derive an error signal of the DFE decision element's input relative to the output or (during the training phase) to a known training pattern, and use the error signal to adapt the DFE coefficient(s) and the response of the CTLE filters. The adaptation modules still further use the error signal to generate "remote info", i.e., adaptation information for the remote pre-equalizers. This remote info is supplied to the training controller(s) 420 (FIG. 4).

Deserializers 509A,B group the digital receive data stream bits or symbols into blocks to enable the use of lower clock rates for subsequent on-chip operations. Alignment marker detection modules 510A, 510B monitor the receive data stream to detect the CM pattern of the alignment markers and achieve alignment marker lock during normal operations, or during training operations to detect the training frame markers and achieve lock thereto. The backchannel information extraction modules 511A, 511B extract the backchannel information from the appropriate portions of the training frames and alignment markers, providing the pre-equalizer adaptation information and status report information to the training controller(s) 420. During normal operations, the multiplexers 512A, 512B, operating under control of the extraction modules 511A, 511B, replace the modified alignment markers with sets of grouped PCS alignment markers, thereby hiding the backchannel information fields from the higher layers. As with the transmit chain, the receive chain may impose a hard boundary 526 between the PMA sublayer and the FEC sublayer, or alternatively, the alignment marker detection information may be communicated to the FEC lane deskew module 513.

During normal operations, the receive data streams from the deserializers are aligned by an FEC lane deskew module 513. If the FEC lanes have somehow gotten switched, an FEC lane reordering module 514 detects the switch based on the contents of the alignment markers and compensates for the switch as the two lanes are multiplexed on a symbol-block basis into a single lane. An RS decoder module 516 operates on the single lane data stream to detect and correct any symbol errors, removing the FEC coding redundancy (parity symbols) during the decoding process.

A transcoding module 520 converts the 256b/257b transmission code words into blocks of four 64b/66b transmission code words distributing the 66-bit code word blocks across four PCS lanes. An alignment marker insertion module 524 converts the sets of grouped alignment markers into individual alignment markers having lane-specific UM patterns, and inserts the individual alignment markers at appropriate positions in the four lanes, accounting for the operation of the transcoding module 520. The four lane PCS data stream is provided to the higher hierarchy layers of the node for eventual communication of the conveyed data to the destination application.

With a sufficiently long pre-equalization filter, the DFE feedback filter may be kept quite short, at say 1 or 2 taps, and even when the channel has a relatively lengthy channel response, the pre-equalization filter may obviate any need for a digital feed forward equalizer (FFE) filter. In this case, the power savings associated with this architecture is expected to be substantial. With temperature changes and general evolution of the channel, however, ongoing adaptation of the pre-equalization filter (i.e., during the normal operations phase) is expected to be necessary.

Figure 6A:
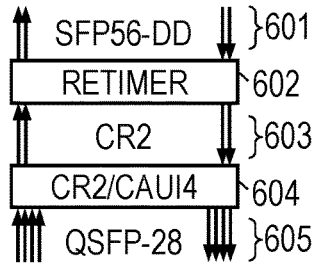
FIG. 6A represents the transceiver operations of a first illustrative SFP56-DD to QSFP-28 cable embodiment.

As the bridge between the host-facing transceivers and the cable-facing transceivers, the Data Link layer 340 (FIG. 3) supports format conversion between the host-facing data stream and the cable-facing data stream. In the illustrative SFP56-DD to QSFP-28 cable embodiment of FIG. 6A, the Data Link layer 340 of transceiver 602 "converts" from the host-facing 100GBASE-KR2 format 601 (differential PAM4 signaling using two lanes in each direction with RS(544, 514) at a rate of 26.5625 GBd per lane) to a cable-facing 100GBASE-CR2 format 603 (differential PAM using 2 lanes in each direction with RS(544,514) at a rate of 26.5625 GBd per lane). As the format difference is essentially only the physical medium, transceiver 602 may omit or bypass the FEC and other sublayers (FIG. 3), such that the Data Link layer 340 is merely operating as a buffer. This operating mode for transceiver 602 is referred to as a "retiming" mode.

Transceiver 604 then converts between the cable-facing 100GBASE-CR2 format 603 and the host-facing format CAUI4 605 (differential, NRZ signaling using four lanes in each direction with RS(528,514) a rate of 25.78125 GBd per lane). The conversion between Reed-Solomon codes necessitates the use of the FEC sublayers, and the Data Link layer implements the conversion between four lanes of NRZ and two lanes of PAM4 signaling. This operating mode is referred to as a "gearbox" mode, alluding to the difference in signaling rates.

While this implementation requires a relatively small number of cable conductors, as discussed in the background the use of PAM4 signaling necessitates the use of undesirably bulky cross sections to provide sufficient performance beyond a cable length of seven meters. The authors have observed the surprising consequence that if 100BASE-CR4 signaling is employed, the doubling in number of cable conductors can be more than offset by the reduction in cross-section of those conductors while still enabling sufficient performance of NRZ signaling at cable lengths of ten meters or more.

Accordingly, the cable embodiments shown in FIGS. 6B-6F each employ a cable-facing 100GBASE-CR4 format 613 (differential NRZ using 4 lanes in each direction with RS(544,514) at 26.5625 GBd per lane). The cable embodiments provide different connectors for interfacing with different standardized ports. For the SFP56-DD and DSFP connectors shown in FIGS. 6B-6E, transceivers 612, 624 convert between the cable-facing 100GBASE-CR4 format 613 and a host-facing 100GBASE-KR2 format 601, both of which employ a signaling rate of 26.5625 GBd with the RS(544,514) encoding, enabling the FEC and other sublayers to be bypassed and enabling the data link layer to merely convert between two lanes of PAM4 and four lanes of NRZ.

The PAM4-NRZ conversion is achieved primarily by bit multiplexing and demultiplexing. Each PAM4 symbol in the host data stream corresponds to a two-bit representation with a most significant bit (msb) and a least significant bit (lsb). A pair of CR4 lanes may be associated with each KR2 lane, with one of the CR4 lanes conveying the msb and the other CR4 lane conveying the lsb. In some contemplated embodiments, the DRR device performs the conversion by demodulating each received data stream, aligning the lanes, multiplexing (or demultiplexing) to convert between NRZ bits and PAM4 symbols, and remodulating the symbols to provide transmit data streams. This operation mode for the DRR devices (i.e., without FEC decoding, error correction, and FEC re-encoding), may be called "bit-mux" mode.

Figure 6B:
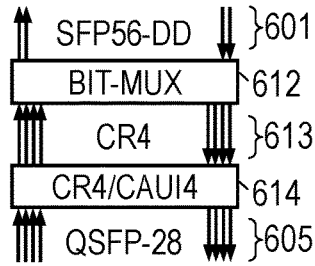
FIG. 6B represents the transceiver operations of a preferred SFP56-DD to QSFP-28 cable embodiment.
Figure 6C:
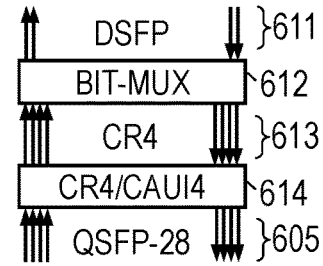
FIG. 6C represents the transceiver operations of an illustrative DSFP to QSFP-28 cable embodiment.
Figure 6D:
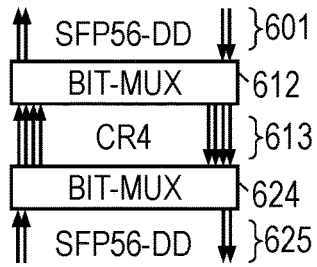
FIG. 6D represents the transceiver operations of an illustrative SFP56-DD cable embodiment.
Figure 6E:
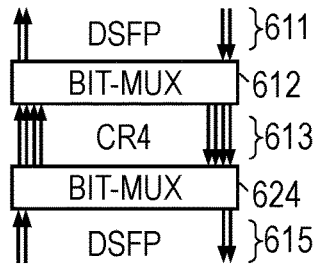
FIG. 6E represents the transceiver operations of an illustrative DSFP cable embodiment.
Figure 6F:
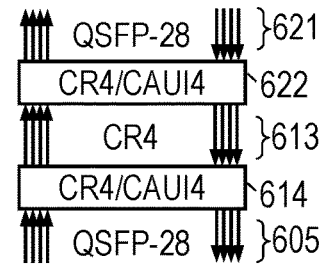
FIG. 6F represents the transceiver operations of an illustrative QSFP-28 cable embodiment.

For the QSFP-28 connectors shown in FIGS. 6B, 6C, and 6F, transceivers 614, 622 convert between the cable-facing 100GBASE-CR4 format 613 and a host-facing CAUI4 format 605, 621. The conversion between Reed-Solomon codes necessitates the use of the FEC sublayers, and the Data Link layer acts primarily as a buffer. This operating mode is also a "gearbox" mode due to the difference in signaling rates.

Figure 7:
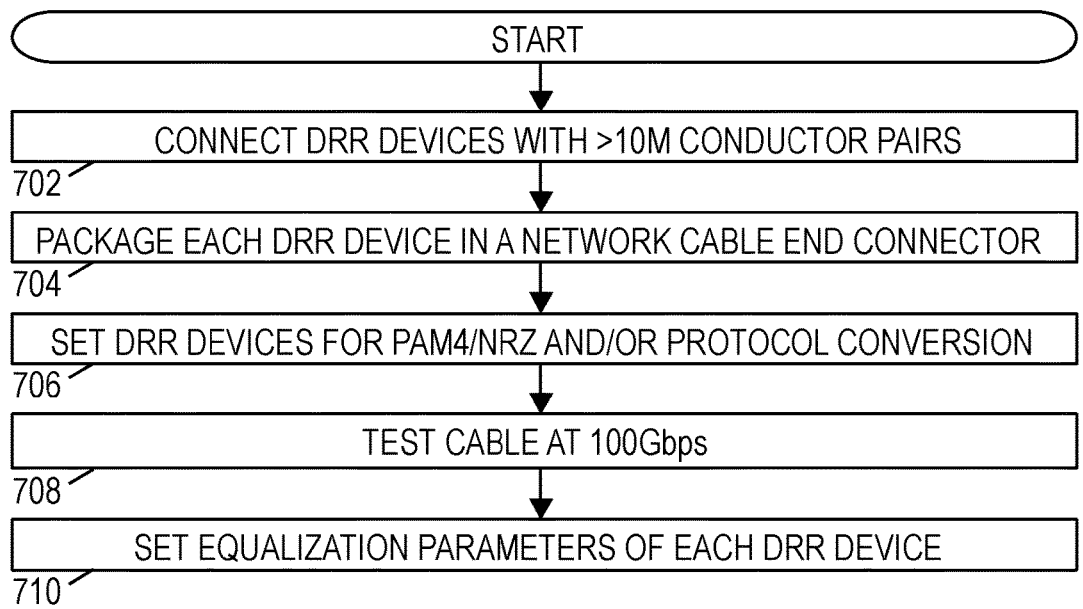
FIG. 7 is a flow diagram of an illustrative cable manufacturing method.

FIG. 7 shows an illustrative cable manufacturing method. It begins in block 702 with electrically connecting the ends of the conductor pairs in the cable cord to the paddle cards, and more specifically, to the center-facing interfaces of the first and second DRR devices. The cable length is preferably about 9 m, 10 m or more. The connecting may be done by automated equipment soldering the wire ends to pads on the paddle cards on which the DRR devices are mounted. In block 704, the equipment packages each paddle card in a respective end connector for the network cable. As previously mentioned, the end connectors may be, e.g., SFP56-DD, QSFP-28, DSFP, or other standardized pluggable modules. The end connectors are adapted to mate with network interface ports of host devices, and include plugs that electrically connect with matching receptacles in the ports.

In block 706, the equipment configures the operation of the DRR devices by, e.g., loading firmware to the nonvolatile memory. Among other things, the DRR devices may be configured to communicate using CAUI4 or 100GBASE-KR2 signaling on their host-facing transceivers and to communicate using 100GBASE-CR4 signaling on their cable-facing transceivers, with suitable conversion between the two signaling protocols as described previously.

In block 708, the equipment tests the cable to verify compliance with performance specifications and to determine cable-dependent equalization parameters for use by the center-facing transmitter and receiver sets 222. The testing is performed by plugging each cable's end connectors into corresponding ports of automated testing equipment (ATE). As the connectors receive power, the MCU chip retrieves firmware code for itself from nonvolatile memory such as an internal flash memory, executing it to coordinate the bootup and operation of the other connector components. The internal flash memory may further include firmware for the embedded controller of the DRR device, and if so, the MCU chip conveys the firmware to the embedded controller via a two wire bus such as I2C or MDIO. In some contemplated embodiments, the two wire bus supports both the I2C protocol and the faster MDIO protocol, and the DRR device switches from one protocol to the other on demand. Once the firmware has been loaded, the MCU chip instructs the embedded controller to execute the firmware. Once both the MCU chip and DRR device are both working, the end connector operates as previously described above.

Channel estimation and equalization are key elements of high bandwidth communication. While the host-facing transmitters and receivers may only need to contend with negligible signal distortion, the center-facing transmitters and receivers will generally have to accommodate severe signal attenuation and distortion. As described above, the equalization may be performed in the receivers using a combination of CTLE, FFE, and DFE elements. In block 708, the DRR devices set their transmit and receive filter coefficients to initial default values. As the communications link is established, the center-facing transmitters and receivers may optionally engage in a training phase to adapt the filter coefficient values. Alternatively, or in addition, the automated testing equipment may begin sending and receiving a training pattern such as, e.g., a pseudo-random binary sequence (PRBS), enabling optional adaptation of the filter coefficients. As yet another alternative or addition, the filter coefficient values may be maintained while the automated test equipment correlates collected error measurements to the training patterns to estimate residual intersymbol interference (ISI). Such residual ISI estimates can be combined with knowledge of the filter coefficient settings to determine, directly or iteratively, the optimum transmit and receive filter coefficient values.

In block 710, the automated tester equipment "burns" the flash memory or otherwise programs the initial default values of the filter coefficients to be the optimum values identified in block 708. The communication between the DRR devices and the ATE to, e.g., collect channel estimation information and refine the default coefficient values, occurs via a two wire interface built in to the pins of the connector plug. The two-wire interface enables the ATE to communicate with the MCU chip, and optionally relies on the MCU chip to access the DRR device registers. Once the filter coefficient values have been programmed, the cable manufacturing process is nominally complete. The cable may then be packaged and sold to customers expecting robust performance.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An active Ethernet cable that comprises:
at least eight pairs of electrical conductors connected between a first connector and a second connector, the at least eight pairs of electrical conductors including at least four pairs of electrical conductors, each of said electrical conductors being 30 AWG or smaller in cross-section and about 10 meters or longer in length;
each of the first and second connectors being adapted to fit into an Ethernet port of a corresponding host device to receive an electrical input signal to the cable conveying an outbound data stream from that host device and to provide an electrical output signal from the cable conveying an inbound data stream to that host device,
each of the first and second connectors includes a respective transceiver that performs clock and data recovery on the electrical input signal to extract and re-modulate the outbound data stream for transit via the at least four pairs of electrical conductors as differential NRZ (non-return to zero) electrical transit signals each having a signaling rate of at least 25 GBd to convey a total of at least 100 GBd in each direction.

2. The active Ethernet cable of claim 1, wherein the electrical input and electrical output signals for at least one of the respective transceivers each comprise two lanes of differential PAM4 signals.

3. The active Ethernet cable of claim 2, wherein the at least one of the respective transceivers uses bit multiplexing or demultiplexing to convert between each lane of differential PAM4 signals and two corresponding lanes of differential NRZ electrical transit signals.

4. The active Ethernet cable of claim 3, wherein the connector for the at least one of the respective transceivers is adapted to fit a SFP56-DD (small form-factor pluggable 56 GBd double density) compliant Ethernet port.

5. The active Ethernet cable of claim 3, wherein the connector for the at least one of the respective transceivers is adapted to fit a DSFP (dual small form-factor pluggable) compliant Ethernet port.

6. The active Ethernet cable of claim 1, wherein the electrical input and electrical output signals for each of the respective transceivers each comprise two lanes of differential PAM4 signals, and wherein each of the respective transceivers uses bit multiplexing or demultiplexing to convert between each lane of differential PAM4 signals and two corresponding lanes of differential NRZ electrical transit signals.

7. The active Ethernet cable of claim 1, wherein the electrical transit signals are protected with a Reed-Solomon (RS) (544,514) forward error correction code.

8. The active Ethernet cable of claim 7, wherein the electrical input and electrical output signals for at least one of the respective transceivers each comprises four lanes of differential NRZ signals protected with a Reed-Solomon (RS) (528,514) forward error correction code, and wherein the at least one of the respective transceivers uses error correction decoding and encoding to convert between the electrical transit signals and the electrical input and output signals.

9. The active Ethernet cable of claim 8, wherein the connector for the at least one of said transceivers is adapted to fit a QSFP-28 (quad small form-factor 28 GBd) compliant Ethernet port.

10. The active Ethernet cable of claim 9, wherein the other of the first and second connectors is adapted to fit either a SFP56-DD compliant Ethernet port or a DSFP compliant Ethernet port.

11. The active Ethernet cable of claim 7, wherein the electrical input and electrical output signals for each of the respective transceivers each comprises four lanes of differential NRZ signals protected with a Reed-Solomon (RS) (528,514) forward error correction code, and wherein each of the respective transceivers uses error correction decoding and encoding to convert between the electrical transit signals and the electrical input and output signals.

12. A cable manufacturing method that comprises:
connecting at least eight pairs of electrical conductors between a first transceiver and a second transceiver, respectively, to transport at least eight differential NRZ electrical transit signals each having a signaling rate of at least 25 GBd to convey a total of at least 100 GBd in each direction, each of the electrical conductors being 30 AWG or smaller in cross-section and about 10 meters or longer in length;
packaging the first transceiver into a first connector configured to couple a first electrical input signal from a network interface port of a first host device to the first transceiver and a first electrical output signal from the first transceiver to the network interface port of the first host device; and
packaging the second transceiver into a second connector configured to couple a second electrical input signal from a network interface port of a second host device to the second transceiver and a second electrical output signal from the second transceiver to the network interface port of the second host device,
the first and second transceivers being configured to perform clock and data recovery on the first and second electrical input signal to extract and re-modulate the first and second outbound data streams as said differential NRZ electrical transit signals.

13. The cable manufacturing method of claim 12, wherein the electrical input and electrical output signals for the first transceiver each comprise two lanes of differential PAM4 signals.

14. The cable manufacturing method of claim 13, wherein the first transceiver uses bit multiplexing or demultiplexing to convert between each of the two lanes of differential PAM4 signals and two corresponding lanes of the differential NRZ electrical transit signals.

15. The cable manufacturing method of claim 13, wherein the first connector is adapted to fit either a SFP56-DD compliant Ethernet port or a DSFP compliant Ethernet port.

16. The cable manufacturing method of claim 12, wherein the electrical transit signals are protected with a RS(544, 514) Reed-Solomon forward error correction code.

17. The cable manufacturing method of claim 16, wherein the electrical input and electrical output signals for the second transceiver each comprises four lanes of differential NRZ signals protected with a Reed-Solomon (RS) (528,514) forward error correction code, and wherein the second transceiver uses error correction decoding and encoding to convert between the electrical transit signals and the electrical input and output signals.

18. The cable manufacturing method of claim 17, wherein the second connector is adapted to fit a QSFP-28 compliant Ethernet port.

19. The cable manufacturing method of claim 18, wherein the first connector is adapted to fit either a SFP56-DD compliant Ethernet port or a DSFP compliant Ethernet port.

* * * * *